No. 673,728. J. RICKS. Patented May 7, 1901.
HORSESHOE ATTACHMENT.
(Application filed Feb. 4, 1901.)

(No Model.)

Witnesses

Inventor
James Ricks.
By
Joseph H. Stewart
Attorney

UNITED STATES PATENT OFFICE.

JAMES RICKS, OF WASHINGTON, DISTRICT OF COLUMBIA.

HORSESHOE ATTACHMENT.

SPECIFICATION forming part of Letters Patent No. 673,728, dated May 7, 1901.

Application filed February 4, 1901. Serial No. 46,012. (No model.)

*To all whom it may concern:*

Be it known that I, JAMES RICKS, a citizen of the United States, residing in the city of Washington, District of Columbia, have invented a new and useful Improvement in Attachments for Horse and other Like Animals' Shoes, of which the following is a specification.

My invention relates to devices which are attached to horseshoes and other like animals' shoes to prevent said animals from slipping and falling in icy or sleety weather and also to enable draft-animals to take a firm foothold on the ground when drawing heavy loads.

It is a well-known fact that horses and other like animals have great difficulty to maintain their equilibrium so as to avoid slipping or falling when traveling over icy or sleety streets and roads, and draft-horses also experience great difficulty in pulling heavy loads over smooth roads because of the tendency of said ordinary shoe to slip and slide under excessive strain; and the object of my invention is to overcome these difficulties by the use of an attachment which when applied to the animal's foot over the ordinary shoe will supplement the holding capacity of the latter by providing sharp bearing-surfaces which will slightly embed themselves in the surface of the street or road, thus securing a firm hold against accidental displacement.

For a complete disclosure of the exact construction and operation of my invention reference is had to the accompanying drawings, in which—

Figure 1:
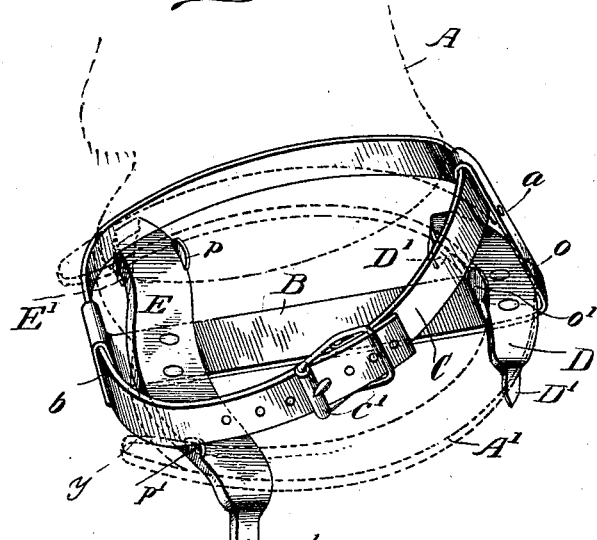
Figure 1:
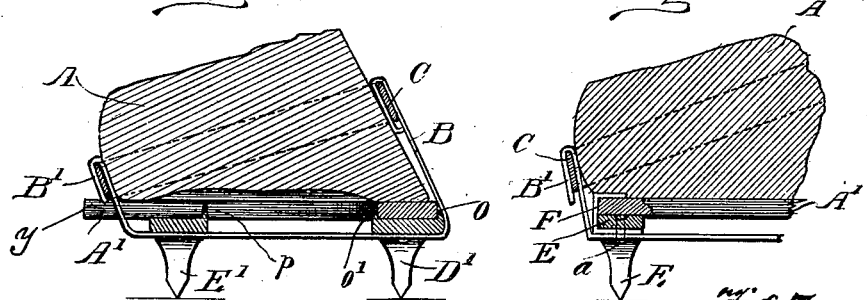
Figure 1:
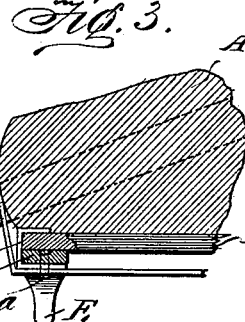
Figure 1:
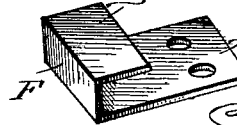
Figure 1:
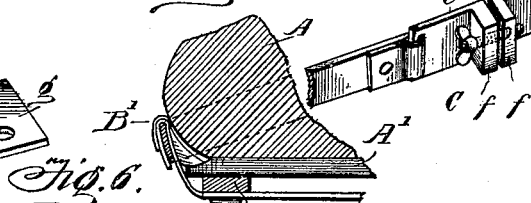
Figure 1:
Figure 1:
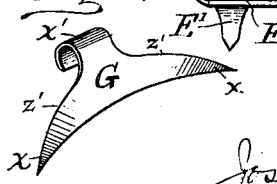

Figure 1 is a perspective view of my device applied to a horse's foot with the shoe in position thereon. Fig. 2 is a vertical longitudinal section of the same. Fig. 3 is a sectional view showing a slightly-modified construction. Fig. 4 is a perspective view of a fastening means for attaching my device to a rubber-heeled shoe, as shown in Fig. 3. Fig. 5 is a detail vertical sectional view showing the means for attaching my improvement to a short heeled shoe. Fig. 6 is a perspective view of the fastening improvements shown in Fig. 5, and Fig. 7 is a perspective view of a modified construction of fastening means for holding the strap in place.

Similar letters represent corresponding parts throughout all the figures of the drawings.

A represents the horse's foot provided with the horseshoe A' of any ordinary construction and applied to the foot in any ordinary or well-known manner.

B represents the main frame of my detaching device, which is made of steel or other metal, and comprises an upwardly-extending lip $a$ at its front end and a corresponding lip $b$ of shorter length at its rear end, both lips being made integral with the long broad strip which unites them and which is designated as the "main frame" of my device. The front lip $a$, extending upwardly against the front of the hoof, is bent rearwardly upon itself to form a loop, while the rear lip $b$ is similarly bent backward to form a loop or pocket, through which and the loop of the front lip is passed the supporting-strap C, and both lips may or may not be riveted. Across the upper face of the main body of the main frame B and immediately behind the front lip and on the upper face of the main frame B is secured the front prong-plate D, having downwardly-extending sharp prongs D' at each end thereof, and similarly arranged across the upper face of the main attaching-frame, at the rear end thereof in front of the rear lip $b$, is a second prong-plate E of larger dimensions than the first prong-plate and provided with downwardly-extending sharp prongs E' at each end thereof. The front prong-plate D, which is secured to the frame B by rivets, as shown, or otherwise, is provided at its front edge with toe-clip $o$ and at its rear edge with a rear clip $o'$, between which two clips rests the toe part of the horseshoe A', and by means of which said prong-plate is held in place. The rear prong-plate is similarly secured to the frame B by rivets, as shown, or any suitable manner and is provided on its front edge, near one end, with a clip $p$ and at the rear edge, near the opposite end, with a similar clip $p'$, both of which catch against the contiguous inner edge of the horseshoe, and thus hold the plate against lateral displacement.

The strap C surrounds the hoof at the front and beneath the fetlock at the rear, passing through the loops formed by the front and rear lips $a$ and $b$, and is adjustably fastened on the side by the buckle C' in the usual manner.

Instead of the fastening just described I may employ the modified form of fastening the strap by screw-buckle, as shown in Fig. 7, in which the contiguous ends of the strap are secured to the metallic plates $e$ $e'$, which are provided in their outer ends with slots, through which the ends of the strap are passed and secured by rivets in the manner illustrated. These plates $e$ $e'$ are provided with shoulders $f$ and $f'$, having a screw-threaded aperture to receive the threaded thumb-screw, by means of which the said plates and straps are adjustably secured together.

In Figs. 3 and 4 the tie-plate F is a modified form of securing my device to a horseshoe made of rubber. The said tie-plate is provided with a base $g$ and the overhanging flange $g'$, which latter is adapted to lie between the heel of the foot and the upper surface of the rubber shoe, while the base $g$, which is apertured to receive fastening-bolts, lies beneath the rear prong-plate E, to which it is secured by bolts or rivets in the manner illustrated.

From the detail description above given it will appear that the operation of my device is as follows: When the foot of the animal has been provided with the ordinary shoe, as A', I apply thereto the main frame of my device, with the prong-plates attached, by simply slipping it onto the foot over the shoe in such a manner as will place the front lip $a$ in front of the hoof at the middle and the rear lip $b$ at the back of the foot beneath the fetlock. The strap C, which is made of leather or metal sheathed flexible material, is passed through the loops of the lips at the front and rear of the shoe and adjustably fastened at the side in the manner described and illustrated. Thus applied my device presents four sharp prongs, so positioned with reference to the sole of the foot as to afford a level bearing for the foot that properly supports the body of the animal, which prongs are adapted to bite into the surface of the street or road with which they come in contact and afford a firm hold against accidental slipping or falling in icy or sleety weather.

This device is equally adaptable for use by draft-horses in pulling heavy loads over smooth roads, to horses traveling over icy or slippery ground, and to race-horses going over smooth speedways.

In Fig. 6 I have shown a supplemental strap-rest G, which is used in case the horseshoe does not have heels projecting outward far enough to afford a support for the fastening-strap C, as seen at $y$ in Figs. 1 and 2 of the drawings. In each of said figures the strap C is shown as supported on the rear ends of the shoe to prevent its slipping down to the ground. In the absence of these supporting rear ends or heels other provision must be made for supporting the strap C, and it is for this purpose that the supplemental strap-rest G is provided. This strap-rest has two wings $x$ and a curved lip $x'$. In placing it in position for use the wings are slipped one over each heel of the shoe under the hoof and the curved lip $x'$ is fitted over the rear lip $b$ of the frame-plate B, thus bringing the supplemental strap-rest between the rear lip $b$ and the rear of the hoof, with the lower edge of the strap C resting upon the upper edge of the wings of the supplemental strap-rest at $z'$, at which point the strap C is supported against falling.

I wish it to be understood that while I have described and illustrated my invention in the specific form of details here shown I do not wish to be confined thereto, as many changes may be made in the form of said details without departing from the principle of my invention.

Having thus described my invention, what I claim, and desire to secure by Letters Patent, is—

1. The combination of the frame-plate B, having the front lip $a$ and rear lip $b$, said lips being formed integral with the plate and placed directly at the front and rear of the hoof, with the front and rear prong-plates D and E, having downwardly-extending prongs at each end, with means for attaching said plates to the animal's foot.

2. The combination of a horseshoe and attachable device composed of a main frame B, with front and rear upwardly-extending lips, each of which is bent over at its upper end to form a loop to receive an attaching-strap, and prong-plates secured to said frame at its upper side, each of which is provided with downwardly-extending prongs and upwardly-extending clips, and a strap and buckle for attaching the device to the animal's foot.

3. The frame-plate B, with its front lip $a$ and its rear lip $b$, the prong-plate D, riveted to the plate B, and provided with prongs at each end and upwardly-extending clips at its front and rear edge, the rear prong-plate E, having downwardly-extending prongs at each end and upwardly-extending clips at its front and rear edges at opposite ends thereof, the fastening-strap C, passing through the loops of the lips and provided with adjustable fastening means, all combined and operating in the manner and for the purpose described.

4. The shoe A', frame-plate B, with its front and rear lips integral therewith as described, prong-plates D and E riveted to plate B and provided with prongs at each end thereof and upwardly-extending clips at the front and rear edges of said prong-plates, fastening-strap C provided with metallic plate $e$, $e'$, having apertured shoulders $f$, $f'$, means for adjustably securing said metallic plates together, the tie-plate F, and the supplemental strap-rest G, all being combined and operating as described.

In testimony whereof I have signed my name to this specification in the presence of two subscribing witnesses.

JAMES RICKS.

Witnesses:
WILLIAM BECKETT,
JAMES A. COBB.